No. 717,900. PATENTED JAN. 6, 1903.
F. P. McELFRESH.
BICYCLE BRAKE.
APPLICATION FILED JUNE 5, 1902.
NO MODEL.
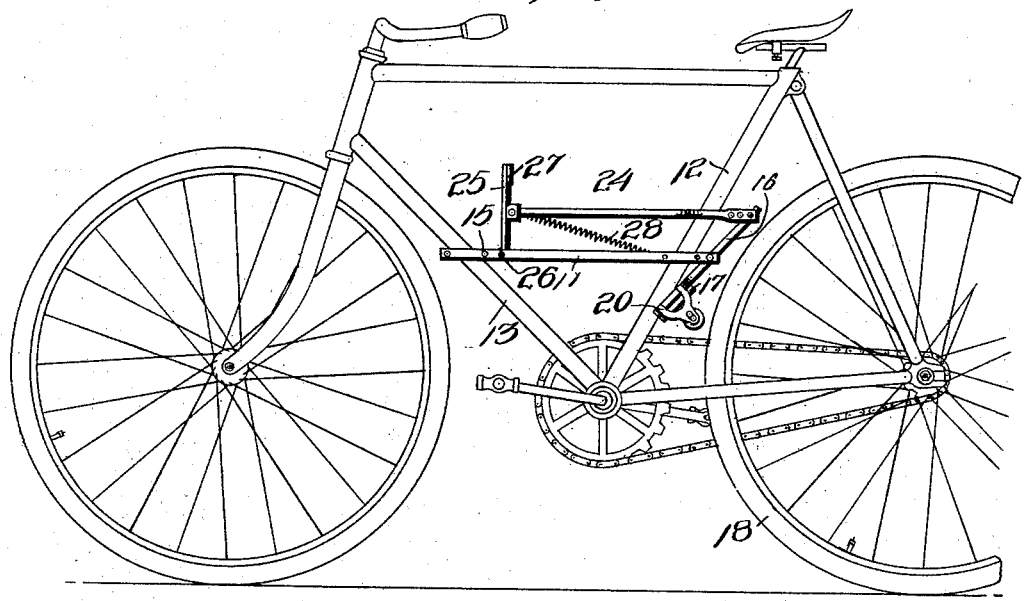
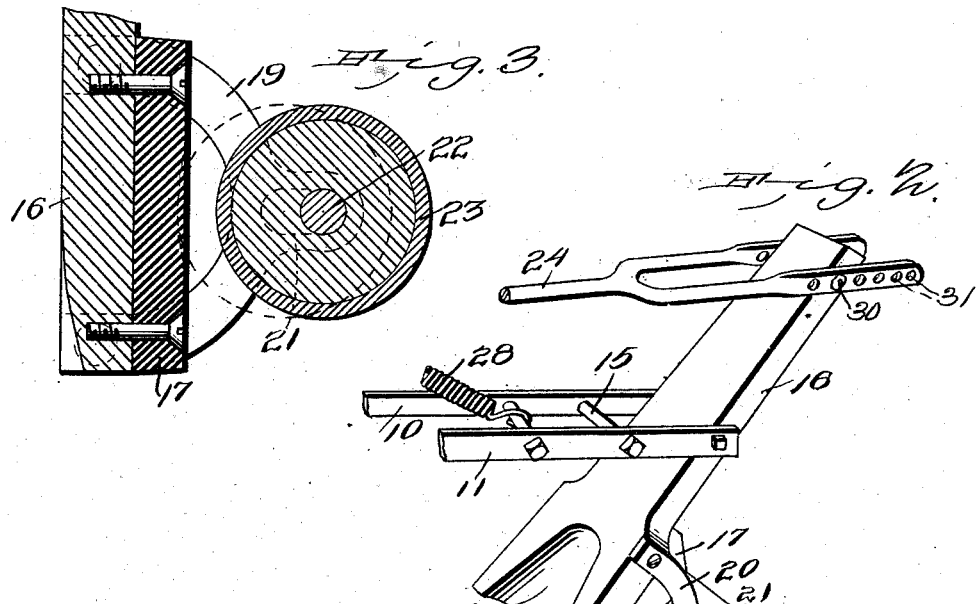
Witnesses
F. P. McElfresh
Inventor
by C. A. Snow & Co.
Attorneys

UNITED STATES PATENT OFFICE.

FRANKLIN PIERCE MCELFRESH, OF JACKSON, IOWA.

BICYCLE-BRAKE.

SPECIFICATION forming part of Letters Patent No. 717,900, dated January 6, 1903.

Application filed June 5, 1902. Serial No. 110,365. (No model.)

*To all whom it may concern:*

Be it known that I, FRANKLIN PIERCE MC-ELFRESH, a citizen of the United States, residing at Jackson, in the county of Shelby and State of Iowa, have invented a new and useful Bicycle-Brake, of which the following is a specification.

This invention relates to bicycle-brakes, and has for its object the production of a brake easily applied to any bicycle and operative either by hand or foot power and which will not exert undue friction upon the yieldable tire.

The invention consists in a lever-arm having a movable roller in its free end adapted to engage the bicycle-tire and be compressed reversely against the lever when in action, so that the friction is borne against the lever and the tire thereby relieved largely of the friction.

The invention further consists in certain novel features of the construction, all as hereinafter shown and described, and specified in the claim.

In the drawings illustrative of the invention, Figure 1 is a side elevation of the bicycle with the improvement attached thereto. Fig. 2 is an enlarged perspective view of the brake mechanism detached. Fig. 3 is an enlarged sectional detail illustrating the construction of the friction-roller and its support.

The device may be applied to any form of bicycle, either the "diamond" frame or ladies' wheel, and may be applied to either the front or rear wheels with slight and unimportant modifications. For the purpose of illustration the device is shown applied to an ordinary diamond-frame bicycle.

The supporting-frame for the device consists in spaced bars 10 11, adapted to be clamped to the standard 12 and the forward brace members 13 of the bicycle-frame by clamp-bolts 15, as shown, this means permitting the spaced bars to be adjusted upon the frame to any required extent. The bars 10 11 extend rearwardly of the standard 12 and pivotally engage a lever-arm 16 between these extended ends, the lever-arm projecting downward between the rear wheel and the standard and provided with a wear-plate 17 on the side next to the wheel, which is indicated at 18.

Attached to the sides of the lower end of the lever 16 are brackets 19 20, each bracket having a slot 21 at right angles to the lever-arm and affording supports for the ends of a shaft 22, the shaft supporting a friction-roller 23 between the brackets, as shown. The slots 21 provide for the movement of the friction-roller 23 toward and away from the wear-plate 17, so that when force is applied to the upper end of the lever-arm 16 the friction-roller 23 will engage the tire of the wheel 18, while at the same time the brackets and the lever, by means of the slots 21, will continue their outward movement until the rear side of the friction-roller engages the wear-plate 17. By this means the friction will be borne almost entirely by the friction-roller and the wear-plate and the tire largely relieved from wear. This is an important feature of the invention and adds materially to its efficiency, as it obviates the objection to the ordinary brake—namely, the undue wear upon the yieldable and flexible tire.

With the device herein illustrated the wear on the tire is minimized and the greater amount of the wear transmitted to the wear-plate 17, which may be readily and cheaply renewed when worn out and without affecting the other parts of the device or of the wheel.

The friction-roller will be suspended loosely in the slots 21, so that it will readily yield to any pressure brought to bear upon it, and will not, therefore, bind in the brackets or become "wedged" therein.

The lever-arm 16 may be operated in any suitable manner by the rider, either by hand or foot power, and for the purpose of illustration a foot-power-operated means is shown. This consists in a rod 24, connected to a lever 25, the latter pivoted at 26 between the bars 10 11 and extending upward and terminating in a pedal 27 in a position convenient to the foot of the rider. If preferred, the lever 25 may be extended to a higher point to be within reach of the hand of the rider. A spring 28 will be connected between the lever 25 or the rod 24 and the frame formed by the members 10 11 to hold the lever 25, rod 24, and lever-arm 16 normally out of engagement, so that the brake will not be in action except when the lever 25 is operated.

The parts may require to be modified slightly to adapt the device to different makes of wheels, wherein the sizes and relative angularity of the braces and standards vary; but this would not be a departure from the principle of the invention or sacrifice any of its advantages.

In applying the device to ladies' wheels it will be attached in the same manner as herein shown, with the bars 10 11 connected to the main curved brace and the forward brace in a nearly vertical position, so as to act upon the forward wheel instead of upon the rear wheel, as herein illustrated; but it is obvious that the action would be the same, and this modification would not be a departure from the spirit of the invention.

The different parts may be made of extremely light strong material, properly braced and supported, and will not increase the weight to any greater extent than any other form of brake mechanism.

The wear-plate 17 may be of any suitable material, but will preferably be comparatively yieldable material—such as sole-leather, rawhide, or some of the harder qualities of rubber—but may be of metal, if preferred. The wear-plate, as above indicated, will preferably be made readily detachable from the lever-arm 16, so that it may be renewed when worn or broken, and as this part is the only portion of the device which is liable to be worn it can be very cheaply and easily renewed, and thereby indefinitely extending the "life" of the device.

The lower end of the lever arm 16 will be preferably formed with a recess 29 in the side next to the standard 12, so that the play of the lever will be increased, as will be readily understood. The distance between the wheel 18 and the standard 12 being generally limited in extent in bicycles, the recess 29 will generally be found necessary in order to secure the requisite movement, but may not be required in bicycles in which the distance between the wheel and the standard is sufficient to permit the necessary movement of the lever.

The rod 24 will preferably be forked at the end by which it is engaged to the lever 16, as indicated in Fig. 2, so that it will embrace the standard 12 upon opposite sides. The fork 24 will be coupled to the lever-arm 16 by pivot-pin 30, and the forks of the rod will be provided with a series of spaced holes 31 to provide for the adjustment of the connection between the lever-arm and the rod, so that the pedal 27 may be adjusted to the size of the rider to enable him to properly reach the pedal with the foot.

By this simple means a very strong and effective brake is applied to the bicycle, within easy reach of the operator, which may be applied instantly and with strong force upon the wheel, so that in emergencies the wheel may be suddenly "braked" and without injury to the wheel.

Having thus described my invention, what I claim is—

In a bicycle-brake, spaced bars coupled to the frame of a bicycle, a lever-arm pivotally supported by said bars, spaced brackets carried by said lever-arm on one side of its fulcrum and disposed at right angles to said lever, a friction-roller yieldably mounted in said brackets, an operating-lever pivotally connected with said spaced bars, a rod connecting said operating-lever to said lever-arm on the other side of its fulcrum, and a spring connected with said operating-lever and the spaced bars for normally holding the roller-carrying end of said lever-arm out of contact with the wheel of the bicycle.

In testimony that I claim the foregoing as my own I have hereto affixed my signature in the presence of two witnesses.

FRANKLIN PIERCE McELFRESH.

Witnesses:
R. P. LARSEN,
P. A. KELGARD.